CRAWFORD & CLARKE.
Mill Spindle.

No. 101,105. Patented March 22, 1870.

Witnesses
Harry King
F. Schmann

Inventor
Wm Crawford
Saml Clarke
per
Alexander J Mason
Attys

United States Patent Office.

WILLIAM CRAWFORD AND SAMUEL CLARKE, OF ATTICA, INDIANA, ASSIGNORS TO THEMSELVES AND J. D. McDONALD, TELFORD & CO.

*Letters Patent No. 101,105, dated March 22, 1870; antedated March 15, 1870.*

IMPROVEMENT IN STOPPING AND STARTING MILL-BURS.

The Schedule referred to in these Letters Patent and making part of the same

*To all whom it may concern:*

Be it known that we, WILLIAM CRAWFORD and SAMUEL CLARKE, of Attica, in the county of Fountain and in the State of Indiana, have invented certain new and useful Improvements in Device for Starting and Stopping Mill-Burs; and do hereby declare that the following is a full, clear, and exact description thereof, reference being had to the accompanying drawings and to the letters of reference marked thereon.

The nature of our invention consists in the construction of a device for starting and stopping millstones, by which the burs are run by friction, so that they can be easily and readily stopped without interfering with any of the other machinery, as will be more fully set forth hereafter.

Letter A represents the frame of our device, which may be constructed of any desired shape or size.

Extending partly across the bottom of the frame is the shaft B, to the end of which is attached the miter-wheel C, which gears with a similar one, D, placed upon the lower end of the vertical shaft G.

Upon the upper end of the shaft G is placed the large gear-wheel H, which meshes into the smaller one K, which has a shoulder formed upon both top and bottom, and which revolves in the metal box or bearings L, secured to the under side of the frame.

Bearing upon the top of the cross-piece O is the upright shaft M, which extends upward through the wheel K and top of the frame, and has the bur N placed upon its upper end.

Figure 1:
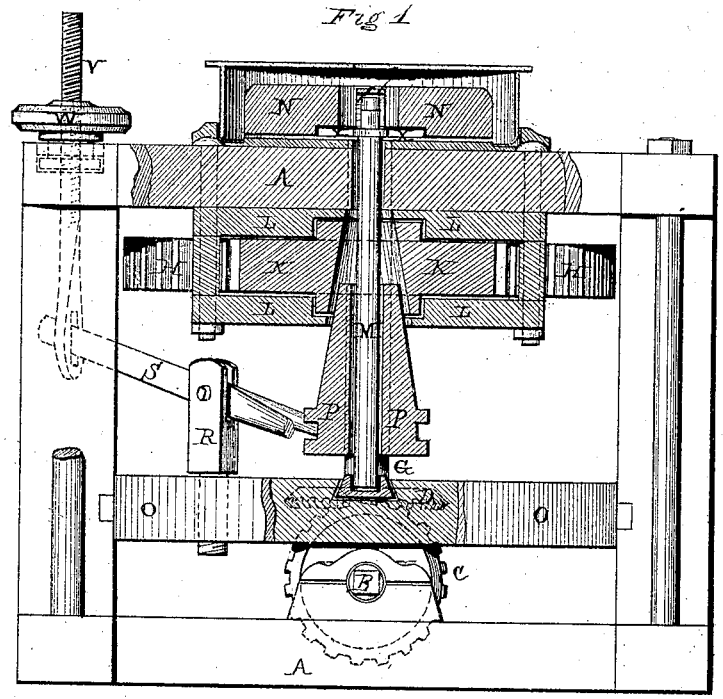
Figure 1 is a side elevation of our invention.
Figure 2:
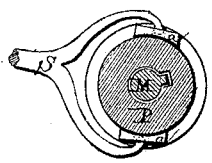
Figure 2 is a horizontal section of the collar, to which the friction is applied for turning the burs.
Figure 3:
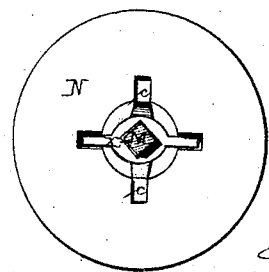
Figure 3 is an inverted view of one of the stones.

Around the lower part of this shaft is passed the collar P, which is made to slide up and down, and which has a groove cut in its inner surface, so as to receive the feather on the shaft M, as seen in fig. 2, so that in revolving the shaft is made to turn also.

Around the lower surface of the collar there is cut a groove, so as to receive the ends of the lever by which it is moved up and down, while the upper part is made to taper towards the top, so as to fit in the tapering opening made in the middle of the wheel K.

Pivoted in the end of the standard R is the forked lever S, by which the collar is raised up and down, and which has a lug, *a*, pivoted to each end of the forks, so as to more effectually grasp the collar.

The outer end of the lever S is passed through a slot formed in the end of the screw-rod V, which, in moving up and down, causes the lever to throw the collar in and out of gear.

Around the top of the rod V is passed the hand-wheel W, by which the rod is easily operated.

Secured to the top of the shaft M is a bar, X, which fits in the notches formed in the bottom of the bur, and which acts as a lever to make it revolve.

Across the opening, in the center of the bur, there is placed a bearing, *c*, which fits upon the top of the shaft M, and serves to balance and steady the stone as it revolves.

In order to set the bur in motion, the miller has only to turn the hand-wheel W until the top of the collar is brought in contact with the inside surface of the wheel K, when the friction causes it to set the shaft and bur in motion, and as each bur is intended to have one of these devices attached to it, any one of them can be started or stopped without interfering with the others.

When any other method than friction is resorted to to stop the stones while in motion, they are raised from their bed-stones, and while they are still running in this way, the grain is merely chopped, not ground, and is an entire loss, with the exception of what will weigh in the bran.

It is immaterial how much machinery is attached to the same power, or how many burs are run by the same, each spindle can be stopped or started by itself, without any jarring motion whatever.

Having thus described our invention,

What we claim, and desire to secure by Letters Patent, is—

The combination and arrangement of the tapering and grooved collar P, shaft M, miter-wheels C D, clutch-lever S, operated through a slot in the screw-lever W, bur N, box L, and wheels H K, the various parts constructed and operated substantially as set forth.

In testimony that we claim the foregoing, we have hereunto set our hands this 13th day of April, 1869.

WILLIAM CRAWFORD.
SAMUEL CLARKE.

Witnesses:
WILLIAM W. WALFORD,
JAMES P. CRAWFORD.